(12) United States Patent
Kottilingam et al.

(10) Patent No.: US 9,555,612 B2
(45) Date of Patent: Jan. 31, 2017

(54) TREATED COMPONENT AND METHODS OF FORMING A TREATED COMPONENT

(71) Applicant: GENERAL ELECTRIC COMPANY, Schenectady, NY (US)

(72) Inventors: Srikanth Chandrudu Kottilingam, Simpsonville, SC (US); Jon Conrad Schaeffer, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 201 days.

(21) Appl. No.: 14/183,600

(22) Filed: Feb. 19, 2014

(65) Prior Publication Data

US 2015/0231796 A1 Aug. 20, 2015

(51) Int. Cl.
| | | |
|---|---|---|
| *B22F 3/24* | (2006.01) | |
| *B33Y 80/00* | (2015.01) | |
| *B22F 5/00* | (2006.01) | |
| *B22F 5/04* | (2006.01) | |
| *B33Y 10/00* | (2015.01) | |
| *B33Y 40/00* | (2015.01) | |
| *B29L 31/08* | (2006.01) | |

(52) U.S. Cl.
CPC ............ *B33Y 80/00* (2014.12); *B22F 3/24* (2013.01); *B22F 5/009* (2013.01); *B22F 5/04* (2013.01); *B33Y 10/00* (2014.12); *B33Y 40/00* (2014.12); *B22F 2003/248* (2013.01); *B22F 2998/10* (2013.01); *B29L 2031/08* (2013.01); *Y02P 10/295* (2015.11); *Y10T 428/24479* (2015.01)

(58) Field of Classification Search
CPC .................................................... B22F 3/1055
See application file for complete search history.

(56) References Cited

U.S. PATENT DOCUMENTS

| | | | |
|---|---|---|---|
| 2006/0260126 A1* | 11/2006 | Groh ...................... | B22F 3/004 29/889.2 |
| 2013/0228302 A1* | 9/2013 | Rickenbacher ....... | C22C 19/056 164/492 |
| 2013/0263977 A1* | 10/2013 | Rickenbacher .......... | B05D 3/06 148/540 |
| 2014/0034626 A1* | 2/2014 | Illston .................. | B23K 26/345 219/121.78 |

(Continued)

OTHER PUBLICATIONS

T. Pollock and S. Tin; "Nickel-Based Superalloys for Advanced Turbine Engines: Chemistry, Microstructure, and Properties", Journal of Propulsion and Power, vol. 22, No. 2, Mar.-Apr. 2006; pp. 361-374.

(Continued)

*Primary Examiner* — George Wyszomierski
*Assistant Examiner* — Ngoclan T Mai
(74) *Attorney, Agent, or Firm* — McNees Wallace & Nurick LLC

(57) ABSTRACT

A treated component and methods for forming a treated component are disclosed. The methods include providing an untreated component having an untreated creep strength. The untreated component is formed by a three-dimensional printing process, and is treated to yield the treated component having a treated creep strength. The treated component comprises an arrangement formed by the three-dimensional printing process, wherein the arrangement has been subjected to treating to increase creep strength.

16 Claims, 1 Drawing Sheet

(56) References Cited

U.S. PATENT DOCUMENTS

2015/0132173 A1* 5/2015 Bruck ................ B23K 26/702
419/1

OTHER PUBLICATIONS

A.D. Rollett, "Microstructure-Properties: I Lecture 5A the Effect of Grain Size on Strength and Toughness", 38 pages, Fall 2007; accessed at http://docs.rapidlibrary.biz/document.php?file=1257194&desc=L5A+GrainSize+HallPetch+05Oct07+.pdf.
J. Blackford, "Engineering of Superalloys", 20 pages, Oct. 18, 2002, accessed at http://www.cmse.ed.ac.uk/AdvMat45/SuperEng.pdf.

* cited by examiner

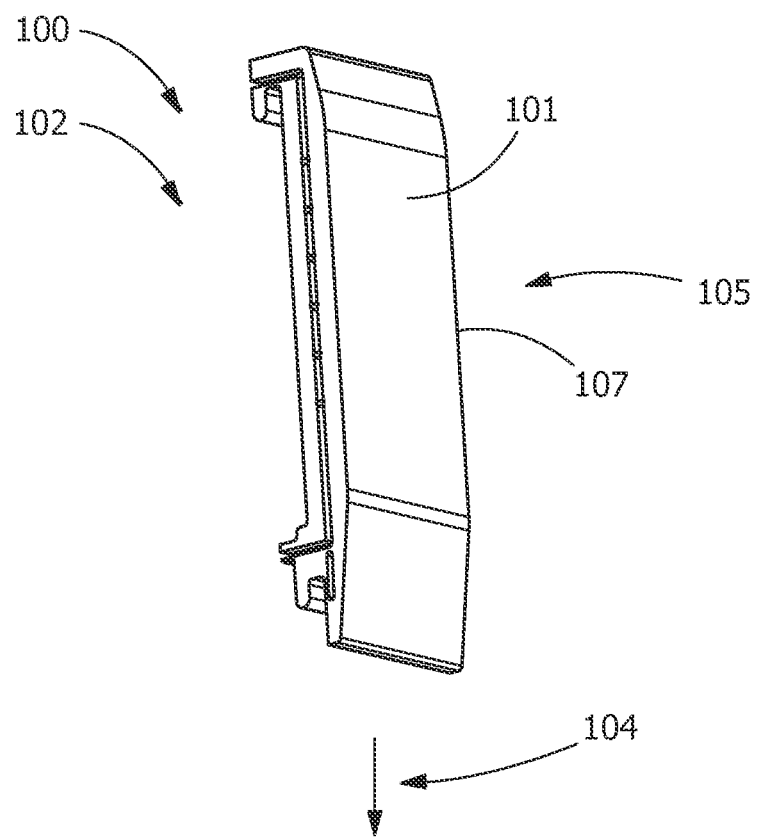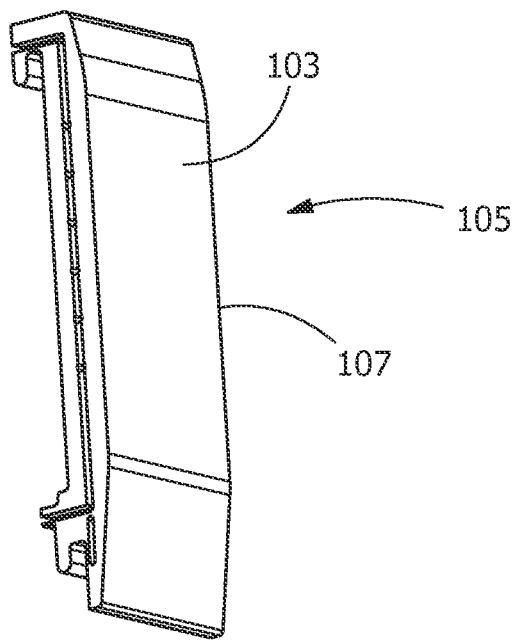

TREATED COMPONENT AND METHODS OF FORMING A TREATED COMPONENT

FIELD OF THE INVENTION

The present invention is directed to a treated component and methods for forming a treated component. More specifically, the present invention is directed to methods which include treating an untreated component formed by a three-dimensional printing process, and a treated component formed by a three-dimensional printing process.

BACKGROUND OF THE INVENTION

Turbine systems are continuously being modified to increase efficiency and decrease cost. One method for increasing the efficiency of a turbine system includes increasing the operating temperature of the turbine system. To increase the temperature, the turbine system must be constructed of materials able to withstand increased temperatures during continued use.

In addition to modifying component materials and coatings, one common method of increasing temperature capability of a turbine component includes the use of complex cooling channels. The complex cooling channels are often incorporated into metals and alloys used in high temperature regions of gas turbines. The complex cooling channels can be difficult to form as brazing and/or thermal spraying of materials often inadvertently fills the complex cooling channels blocking the flow of cooling fluids, such as air from a compressor section of a gas turbine.

Three-dimensional printing processes are relatively inexpensive processes capable of manufacturing difficult to fabricate components, including components with complex cooling channels. However, some components printed by three-dimensional printing processes do not have the same temperature tolerance as cast, forged or milled parts.

Manufacturing methods that do not suffer from one or more of the above drawbacks would be desirable in the art.

BRIEF DESCRIPTION OF THE INVENTION

In one embodiment, a method of forming a treated component is provided. The method includes providing an untreated component having an untreated creep strength. The untreated component is formed by a three-dimensional printing process. The untreated component is treated to yield the treated component having a treated creep strength. The treated creep strength is greater than the untreated creep strength.

In another embodiment, a method of forming a treated component is provided. The method includes providing an untreated component having an untreated creep strength. The untreated component is formed by a three-dimensional printing process and has a plurality of grains with a grain size of about 25 micrometers (0.001 inches) to about 254 micrometers (0.010 inches). The untreated component is treated to yield the treated component having a treated creep strength. The treating of the untreated component includes heat-treating, and diffusing at least one element into, the untreated component. The treated component is a hot gas path component or a gas turbine combustion component. The heat-treating causes the plurality of grains to grow to about 127 micrometers (0.005 inches) to about 3,175 micrometers (0.125 inches). The at least one element is pinned to grain boundaries between the plurality of grains forming a plurality of precipitates, the plurality of precipitates preventing grain boundary sliding and dislocation motion. The treated creep strength is about 25% to about 100% greater than the untreated creep strength at 1,600° F.

In yet another embodiment, a treated component formed by a three-dimensional printing process is provided. The treated component includes an arrangement formed by the three-dimensional printing process, wherein the arrangement has been subjected to treating to increase creep strength.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 1 is a depiction of a method of forming a treated component, according to an embodiment of the disclosure.

Wherever possible, the same reference numbers will be used throughout the drawings to represent the same parts or steps.

DETAILED DESCRIPTION OF THE INVENTION

Provided are a treated component and methods of forming a treated component. Embodiments of the present disclosure, in comparison to processes and articles that do not include one or more of the features disclosed herein, provide an increase in creep strength, a higher operational temperature limit, increased corrosion resistance, increased oxidation resistance, increased wear and fatigue resistance, or a combination thereof.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements.

Referring to FIG. 1, a method 100 for forming a treated component 103 is provided. In one embodiment the method 100 includes providing, step 102, an untreated component 101 having an untreated creep strength, the untreated component 101 having been formed by a three-dimensional printing process. The method 100 further includes treating, step 104, the untreated component 101 to yield the treated component 103 having a treated creep strength. The treated creep strength is greater than the untreated creep strength.

Examples of three-dimensional printing processes include, but are not limited to, the processes known to those of ordinary skill in the art as Direct Metal Laser Melting (DMLM), Direct Metal Laser Sintering (DMLS), Selective Laser Sintering (SLS), Selective Laser Melting (SLM), Electron Beam Melting (EBM), other suitable processes, or a combination thereof. As used herein, the term "three-dimensional printing process" refers to the processes described above as well as other suitable current or future processes that include the build-up of materials layer by layer.

The method 100 includes any suitable technique(s) for the treating, step 104, to increase creep strength. For example, suitable techniques include, but are not limited to, heat-treating the untreated component 101, diffusing at least one element into the untreated component 101, or both.

The method 100 includes any suitable sequence(s) for the treating, step 104, to increase creep strength. In one embodiment, the treating, step 104, of the untreated component 101 includes the heat-treating of, followed by the diffusing of the at least one element into, the untreated component 101. In an alternate embodiment, the treating, step 104, of the untreated component 101 includes the diffusing of the at least one element into, followed by the heat-treating of, the untreated component 101. In yet another embodiment, the treating, step 104, of the untreated component 101 includes the simultaneously heat-treating of the untreated component 101 and the diffusing of the at least one element into the untreated component 101.

The temperature of the heat-treating is any suitable temperature capable of increasing creep strength. In one embodiment, suitable for materials including, but not limited to, nickel-based superalloys and stainless steels, the heat-treating is conducted at a temperature range of about 1,800° F. to about 2,300° F., alternatively 1,800° F. to about 2,000° F., alternatively 1,900° F. to about 2,100° F., alternatively 2,000° F. to about 2,200° F., alternatively 2,100° F. to about 2,300° F., or any suitable combination, sub-combination, range, or sub-range therein. In another embodiment, suitable for materials including, but not limited to, non-stainless steels, the heat-treating is conducted at a temperature range of about 1,450° F. to about 1,900° F., alternatively 1,450° F. to about 1,600° F., alternatively 1,600° F. to about 1,750° F., alternatively 1,750° F. to about 1,900° F., or any suitable combination, sub-combination, range, or sub-range therein.

The duration of the heat-treating is any suitable duration capable of increasing creep strength. In one embodiment, the heat-treating is conducted for about 1 hour to about 24 hours, alternatively about 1 hour to about 12 hours, alternatively about 12 hours to about 24 hours, alternatively about 1 hour to about 8 hours, alternatively about 8 hours to about 16 hours, alternatively about 16 hours to about 24 hours, alternatively about 1 hour to about 4 hours, alternatively about 4 hours to about 8 hours, alternatively about 8 hours to about 12 hours, alternatively about 12 hours to about 16 hours, alternatively about 16 hours to about 20 hours, alternatively about 20 hours to about 24 hours, or any suitable combination, sub-combination, range, or sub-range therein.

The microstructure of the untreated component 101 includes any sized grains permitting the increase of creep strength through the treating, step 104. In one embodiment, the untreated component 101 has a plurality of grains with grain size of about 25 micrometers (0.001 inches) to about 254 micrometers (0.010 inches), alternatively about 25 micrometers (0.001 inches) to about 178 micrometers (0.007 inches), alternatively about 25 micrometers (0.001 inches) to about 102 micrometers (0.004 inches), alternatively about 51 micrometers (0.002 inches) to about 152 micrometers (0.006 inches), alternatively about 102 micrometers (0.004 inches) to about 203 micrometers (0.008 inches), alternatively about 152 micrometers (0.006 inches) to about 254 micrometers (0.010 inches), or any suitable combination, sub-combination, range, or sub-range therein.

The microstructure of the treated component 103 includes any suitable increase in grain size permitting the increase of creep strength through the treating, step 104. In one embodiment, the treating, step 104, of the untreated component 101 includes the heating-treating, wherein the heat-treating of the untreated component 101 causes the plurality of grains of the untreated component 101 to grow to about 127 micrometers (0.005 inches) to about 3,175 micrometers (0.125 inches), alternatively about 635 micrometers (0.025 inches) to about 3,175 micrometers (0.125 inches), alternatively about 1,270 micrometers (0.050 inches) to about 3,175 micrometers (0.125 inches), alternatively about 1,905 micrometers (0.075 inches) to about 3,175 micrometers (0.125 inches), alternatively about 2,540 micrometers (0.100 inches) to about 3,175 micrometers (0.125 inches), alternatively about 127 micrometers (0.005 inches) to about 635 micrometers (0.025 inches), alternatively about 635 micrometers (0.025 inches) to about 1,270 micrometers (0.050 inches), alternatively about 1,270 micrometers (0.050 inches) to about 1,905 micrometers (0.075 inches), alternatively about 1,905 micrometers (0.075 inches) to about 2,540 micrometers (0.100 inches), or any suitable combination, sub-combination, range, or sub-range therein.

The increase in creep strength of the treated component 103 relative to the untreated component 101 is any suitable increase in creep strength. In one embodiment, the treating, step 104, of the untreated component 101 includes the heating-treating, wherein the treated component 103 has a treated creep strength about 25% to about 100% greater than the creep strength of the untreated component 101 at 1,600° F., alternatively about 25% to about 50% greater, alternatively about 50% to about 75% greater, alternatively about 75% to about 100% greater, or any suitable combination, sub-combination, range, or sub-range therein.

The at least one element diffused into the untreated component 101 is any suitable element capable of increasing creep strength. In one embodiment, the treating, step 104, of the untreated component 101 includes the diffusing of the at least one element into the untreated component 101, wherein the at least one element is any suitable element, including, but not limited to, carbon, boron, nitrogen, aluminum or combinations thereof.

The process conditions for diffusion of the at least one element into the untreated component 101 are any suitable process conditions capable of increasing creep strength. In one embodiment, the diffusing of the at least one element into the untreated component 101 pins the at least one element to grain boundaries between the plurality of grains forming a plurality of precipitates, the plurality of precipitates preventing grain boundary sliding and dislocation motion. In a further embodiment, the at least one element diffused into the untreated component 101, includes, but is not limited to, carbon, boron, nitrogen, or combinations thereof, which combines with other elements present in the untreated component 101, such as, but not limited to, chromium, molybdenum, tungsten, tantalum and titanium, to form a variety of carbides, nitrides, carbo-nitrides and borides which form the plurality of precipitates.

The increase in creep strength of the treated component 103 relative to the untreated component 101 is any suitable increase in creep strength. In one embodiment, the treating, step 104, of the untreated component 101 includes the diffusing of the at least one element into the untreated component 101, wherein the treated component 103 has a treated creep strength about 25% to about 90% greater than the creep strength of the untreated component 101 at 1,600° F., alternatively about 25% to about 50% greater, alternatively about 50% to about 75% greater, alternatively about 75% to about 90% greater, or any suitable combination, sub-combination, range, or sub-range therein.

The application technique for diffusion of the at least one element into the untreated component 101 is any suitable application technique capable of increasing creep strength. In one embodiment, the treating, step 104, of the untreated component 101 includes the diffusing of the at least one element into the untreated component 101, wherein the diffusing of the at least one element into the untreated component 101 includes any suitable technique, including, but not limited to, chemical diffusion, gas diffusion, pack diffusion, chemical vapor deposition (CVD), physical vapor deposition (PVD), sputtering, or a combination thereof.

The component is any suitable component in need of increased creep strength. In one embodiment, the treated component 103 is a hot gas path component, a compressor component, or a gas turbine combustion component. In another embodiment, the treated component 103 is a shroud 105 (as shown by way of example), a nozzle, a bucket, a seal, a liner, a fuel nozzle component, or a combination thereof.

The formation process of the untreated component 101 is any suitable formation process capable of producing an untreated component 101 very close to the final shape of the untreated component 101. In one embodiment, the untreated component 101 is formed to near-net shape. As used herein "near-net shape" means that the untreated component 101 is formed by a three-dimensional printing process very close to the final shape of the untreated component 101, not requiring significant traditional mechanical finishing techniques such as machining or grinding following the three-dimensional printing process.

The material is any suitable material capable of forming the untreated component 101. In one embodiment, the three-dimensional printing process includes melting an atomized powder. In a further embodiment, the atomized powder is any suitable material, including, but not limited to, a metal, a metal alloy including steel, a stainless steel, a nickel based superalloy, a cobalt based superalloy, a metallic, a ceramic or a combination thereof. In another embodiment, the atomized powder is any suitable material, including, but not limited to, a stainless steel, a tool steel, nickel, cobalt, chrome, titanium, aluminum or a combination thereof. In one embodiment, the atomized powder is CoCrMo. In another embodiment, the atomized powder has a composition, by weight, of: about 10% nickel, about 29% chromium, about 7% tungsten, about 1% iron, about 0.25% carbon, about 0.01% boron, and balance cobalt (e.g. FSX414); about 0.015% boron, about 0.05% to about 0.15% carbon, about 20% to about 24% chromium, about 3% iron, about 0.02% to about 0.12% lanthium, about 1.25% manganese, about 20% to about 24% nickel, about 0.2% to about 0.5% silicon, about 13% to about 15% tungsten, and balance cobalt (e.g. HAYNES® 188); about 22.5% to about 24.25% chromium, up to about 0.3% titanium (e.g., about 0.15% to about 0.3% titanium), about 6.5% to about 7.5% tungsten, about 9% to about 11% nickel, about 3% to about 4% tantalum, up to about 0.65% carbon (e.g., about 0.55% to about 0.65% carbon), about 2% to about 3% boron (e.g., about 2% to about 3% boron), about 1.3% iron, up to about 0.4% silicon, up to about 0.1% manganese, up to about 0.02% sulfur, and balance cobalt (e.g. MarM509); about 0.05% carbon, about 20% nickel, about 20% chromium, about 0.1% zirconium, about 7.5% tantalum, and balance cobalt (e.g. MarM918); about 6.6% to about 7.0% chromium, about 11.45% to about 12.05% cobalt, about 5.94% to about 6.30% aluminum, about 0.02% titanium, about 4.70% to about 5.10% tungsten, about 1.3% to about 1.7% molybdenum, about 2.6% to about 3.0% rhenium, about 6.20% to about 6.50% tantalum, about 1.3% to about 1.7% hafnium, about 0.10% to about 0.14% carbon, about 0.0035% manganese, about 0.03% zirconium, about 0.01% to about 0.02% boron, about 0.2% iron, about 0.06% silicon, about 0.1% potassium, about 0.004% sulfur, about 0.1% niobium, and balance nickel (e.g. René 142); about 13.70% to about 14.30% chromium, about 9% to about 10% cobalt, about 3.2% aluminum, about 4.8% to about 5.20% titanium, about 3.7% to about 4.3% tungsten, about 0.1% rhenium, up to about 4.3% rhenium and tungsten combined, about 0.5% tantalum, about 0.1% hafnium, about 0.15% to about 0.19% carbon, about 0.15% palladium, about 0.3% platinum, about 0.01% magnesium, about 0.02% to about 0.1% zirconium, about 0.01% to about 0.02% boron, about 0.35% iron, about 0.1% silicon, about 0.1% manganese, about 0.015% phosphorus, about 0.0075% sulfur, about 0.1% niobium, and balance nickel (e.g. René 80); about 0.08 to about 0.12% carbon, about 22.2 to about 22.8% chromium, about 0.10% manganese, about 0.25% silicon, about 18.5 to about 19.5% cobalt, about 1.8 to about 2.2% tungsten, about 2.3% titanium, about 1.2% aluminum, about 1.0% tantalum, about 0.8% niobium, about 0.05% zirconium, about 0.008% boron, and balance nickel (e.g. GTD-222®, available from General Electric Company); about 20% chromium, about 10% cobalt, about 8.5% molybdenum, up to about 2.5% titanium, about 1.5% aluminum, up to about 1.5% iron, up to about 0.3% manganese, up to about 0.15% silicon, about 0.06% carbon, about 0.005% boron, and balance nickel (e.g. HAYNES® 282); about 20% to about 24% chromium, about 10% to about 15% cobalt, about 8% to about 10% molybdenum, about 0.8% to about 1.5% aluminum, about 0.05% to about 0.15% carbon, about 3.0% iron, about 1.0% manganese, about 0.015% silicon, about 0.015% sulfur, about 0.6% titanium, about 0.5% copper, about 0.006% boron, and balance nickel (e.g. IN617); about 5% iron, about 20% to about 23% chromium, up to about 0.5% silicon, about 8% to about 10% molybdenum, up to about 0.5% manganese, up to about 0.1% carbon, and balance nickel (e.g. IN625); or about 50% to about 55% nickel and cobalt combined, about 17% to about 21% chromium, about 4.75% to about 5.50% columbium and tantalum combined, about 0.08% carbon, about 0.35% manganese, about 0.35% silicon, about 0.015% phosphorus, about 0.015% sulfur, about 1.0% cobalt, about 0.35% to 0.80% aluminum, about 2.80% to about 3.30% molybdenum, about 0.65% to about 1.15% titanium, about 0.001% to about 0.006% boron, about 0.15% copper, and balance of iron (e.g. IN718).

A treated component 103 formed by a three-dimensional printing process is provided. In one embodiment, the treated component 103 formed by a three-dimensional printing process includes an arrangement 107 formed by the three-dimensional printing process, wherein the arrangement 107 has been subjected to treating, step 104, to increase creep strength.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of forming a treated component comprising:
providing an untreated component having an untreated creep strength, the untreated component formed by a three-dimensional printing process; and
treating the untreated component to yield the treated component having a treated creep strength, the treating comprising diffusing at least one element into the untreated component, wherein the at least one element is pinned to grain boundaries between a plurality of grains, the at least one element forming a plurality of precipitates, the plurality of precipitates preventing grain boundary sliding and dislocation motion,
wherein the treated creep strength is greater than the untreated creep strength.

2. The method of claim 1, wherein the treating of the untreated component comprises heat-treating the untreated component.

3. The method of claim 2, wherein the heat-treating is conducted at a temperature range of about 1800° F. to about 2300° F.

4. The method of claim 2, wherein the heat-treating is conducted for about 1 hour to about 24 hours.

5. The method of claim 2, wherein the untreated component comprises a plurality of grains with grain size of about 25 micrometers (0.001 inches) to about 254 micrometers (0.010 inches), and wherein the heat-treating of the component causes the plurality of grains to grow to about 127 micrometers (0.005 inches) to about 3,175 micrometers (0.125 inches).

6. The method of claim 2 wherein the treated creep strength is about 25% to about 100% greater than the untreated creep strength at 1,600° F.

7. The method of claim 1, wherein the treated creep strength is about 25% to about 90% greater than the untreated creep strength of the component at 1,600° F.

8. The method of claim 1, wherein the diffusing of the at least one element comprises a process selected from the group consisting of thermal chemical diffusion, gas diffusion, pack diffusion, chemical vapor deposition (CVD), physical vapor deposition (PVD), and combinations thereof.

9. The method of claim 1, wherein the at least one element is selected from the group consisting of carbon, boron, nitrogen, aluminum, and combinations thereof.

10. The method of claim 1, wherein the treated component is a hot gas path component or a gas turbine combustion component.

11. The method of claim 10, wherein the treated component is selected from the group consisting of a shroud, a nozzle, a bucket, a seal, a liner, a fuel nozzle component, and combinations thereof.

12. The method of claim 1, wherein the untreated component is formed to near-net shape.

13. The method of claim 1, wherein the three-dimensional printing process comprises melting an atomized powder.

14. The method of claim 13, wherein the atomized powder comprises a material selected from the group consisting of metals, metal alloys, steel, stainless steel, nickel based superalloys, cobalt based superalloys, ceramics, and combinations thereof.

15. The method of claim 13, wherein the atomized powder comprises a material selected from the group consisting of stainless steel, tool steel, nickel, cobalt chrome, titanium, aluminum, and combinations thereof.

16. A method of forming a treated component comprising:
providing an untreated component having an untreated creep strength, the untreated component formed by a three-dimensional printing process and having a plurality of grains with a grain size of about 25 micrometers (0.001 inches) to about 254 micrometers (0.010 inches); and
treating the untreated component to yield the treated component having a treated creep strength, wherein:
the treating of the untreated component comprises heat-treating, and diffusing at least one element into, the untreated component;
the treated component is a hot gas path component or a gas turbine combustion component;
the heat-treating causes the plurality of grains to grow to about 127 micrometers (0.005 inches) to about 3,175 micrometers (0.125 inches); and
the at least one element is pinned to grain boundaries between the plurality of grains forming a plurality of precipitates, the plurality of precipitates preventing grain boundary sliding and dislocation motion,
wherein the treated creep strength is about 25% to about 100% greater than the untreated creep strength at 1,600° F.

* * * * *